US011720743B2

(12) United States Patent
Chowaniec et al.

(10) Patent No.: US 11,720,743 B2
(45) Date of Patent: *Aug. 8, 2023

(54) SYSTEM AND METHOD FOR DOCUMENT TRANSLATION IN A FORMAT AGNOSTIC DOCUMENT VIEWER

(71) Applicant: Open Text SA ULC, Halifax (CA)

(72) Inventors: Michael John Chowaniec, Phoenix, AZ (US); Thomas Demmler, Constance (DE); Jeremy Paul Duke, Gilbert, AZ (US)

(73) Assignee: OPEN TEXT SA ULC, Halifax (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/545,315

(22) Filed: Dec. 8, 2021

(65) Prior Publication Data

US 2022/0100950 A1    Mar. 31, 2022

Related U.S. Application Data

(63) Continuation of application No. 16/919,370, filed on Jul. 2, 2020, now Pat. No. 11,227,101.

(60) Provisional application No. 62/870,856, filed on Jul. 5, 2019.

(51) Int. Cl.
*G06F 17/00*    (2019.01)
*G06F 40/166*    (2020.01)
*G06F 40/103*    (2020.01)
*G06F 3/04842*    (2022.01)

(52) U.S. Cl.
CPC .......... *G06F 40/166* (2020.01); *G06F 40/103* (2020.01); *G06F 3/04842* (2013.01)

(58) Field of Classification Search
CPC .. G06F 40/166; G06F 40/103; G06F 3/04842; G06F 40/40
See application file for complete search history.

(56) References Cited

U.S. PATENT DOCUMENTS

| | | | | |
|---|---|---|---|---|
| 5,524,137 A * | 6/1996 | Rhee | ...................... | H04N 7/147 434/156 |
| 6,363,337 B1 * | 3/2002 | Amith | ..................... | G06F 40/55 704/7 |
| 6,430,624 B1 * | 8/2002 | Jamtgaard | ............. | G06F 16/957 707/E17.119 |
| 7,197,502 B2 * | 3/2007 | Feinsmith | .............. | G06Q 30/06 707/999.009 |
| 7,398,464 B1 * | 7/2008 | Wei | ....................... | G06F 40/151 715/239 |

(Continued)

*Primary Examiner* — Hassan Mrabi
(74) *Attorney, Agent, or Firm* — Sprinkle IP Law Group

(57) ABSTRACT

Systems and methods are disclosed for a format agnostic document viewer with document translation that provide the ability for a user to either select a portion of the viewed document text in the format agnostic viewer and have it translated into a selected language, or for the user to have the entire document presented in the format agnostic viewer in translated form. The translated text may be shown side-by-side with the original document text in the format agnostic viewer, or can replace the original text on the visible page in the format agnostic viewer. The translated text may be formatted according to, or displayed with, some enhancements to account for differences in the original text and translated text or other differences.

21 Claims, 11 Drawing Sheets

(56) References Cited

U.S. PATENT DOCUMENTS

| | | | | |
|---|---|---|---|---|
| 8,126,697 | B1* | 2/2012 | Manroa | G10L 15/26 |
| | | | | 704/235 |
| 9,053,500 | B2* | 6/2015 | Etesse | G09B 7/02 |
| 10,162,805 | B2* | 12/2018 | Grigorovitch | G06F 16/972 |
| 10,269,073 | B1* | 4/2019 | Bodson | H04L 69/08 |
| 2002/0161579 | A1* | 10/2002 | Saindon | G10L 15/26 |
| | | | | 704/235 |
| 2003/0182578 | A1* | 9/2003 | Warnock | G06Q 30/06 |
| | | | | 713/176 |
| 2004/0167784 | A1* | 8/2004 | Travieso | G06F 40/44 |
| | | | | 704/277 |
| 2004/0261021 | A1* | 12/2004 | Mittal | G06F 16/972 |
| | | | | 707/E17.058 |
| 2005/0267647 | A1* | 12/2005 | Kamdar | G06F 40/58 |
| | | | | 701/1 |
| 2007/0075747 | A1* | 4/2007 | Apelbaum | G06F 11/1482 |
| | | | | 327/20 |
| 2008/0082317 | A1* | 4/2008 | Rosart | G06F 40/263 |
| | | | | 704/8 |
| 2008/0140383 | A1* | 6/2008 | Bailey | G06F 40/58 |
| | | | | 704/8 |
| 2008/0244740 | A1* | 10/2008 | Hicks | G06F 40/166 |
| | | | | 715/239 |
| 2008/0275977 | A1* | 11/2008 | Schmidt | H04L 67/568 |
| | | | | 709/223 |
| 2008/0288239 | A1* | 11/2008 | Bailey | G06F 40/58 |
| | | | | 704/2 |
| 2010/0106482 | A1* | 4/2010 | Hardacker | H04N 21/8133 |
| | | | | 348/468 |
| 2010/0286977 | A1* | 11/2010 | Chin | G06Q 10/00 |
| | | | | 704/4 |
| 2011/0093254 | A1* | 4/2011 | Kuhn | G06F 40/103 |
| | | | | 704/2 |
| 2012/0016655 | A1* | 1/2012 | Travieso | G06F 16/972 |
| | | | | 704/2 |
| 2012/0240039 | A1* | 9/2012 | Walker | G06Q 10/10 |
| | | | | 715/265 |
| 2012/0246295 | A1* | 9/2012 | Gonzalez-Banos | |
| | | | | H04L 12/1822 |
| | | | | 709/224 |
| 2013/0103384 | A1* | 4/2013 | Hunter | G06F 9/454 |
| | | | | 704/3 |
| 2013/0262080 | A1* | 10/2013 | Marciano | G06F 40/47 |
| | | | | 704/3 |
| 2014/0164902 | A1* | 6/2014 | Sager | G06F 9/454 |
| | | | | 715/234 |
| 2014/0337008 | A1* | 11/2014 | Morimoto | G06F 40/58 |
| | | | | 704/3 |
| 2015/0046798 | A1* | 2/2015 | Ishihara | G06F 9/451 |
| | | | | 715/249 |
| 2015/0081723 | A1* | 3/2015 | Ogawa | G06F 16/284 |
| | | | | 709/204 |
| 2015/0149146 | A1* | 5/2015 | Abramovitz | H04R 25/353 |
| | | | | 381/80 |
| 2016/0085738 | A1* | 3/2016 | Briggs | G06F 40/18 |
| | | | | 715/219 |
| 2016/0139786 | A1* | 5/2016 | Kaldma | G06F 40/12 |
| | | | | 715/716 |
| 2016/0283184 | A1* | 9/2016 | Marshall | H04L 67/01 |
| 2016/0283492 | A1* | 9/2016 | Duminy | G06F 16/116 |
| 2016/0357732 | A1* | 12/2016 | Hsu | G06V 20/63 |
| 2018/0189023 | A1* | 7/2018 | Garmark | H04N 21/42203 |
| 2018/0196788 | A1* | 7/2018 | Grigorovitch | G06F 40/106 |
| 2018/0300218 | A1* | 10/2018 | Lipka | G06F 40/40 |
| 2019/0087656 | A1* | 3/2019 | King | G06Q 30/00 |
| 2019/0108493 | A1* | 4/2019 | Nelson | G06Q 10/1095 |
| 2019/0156162 | A1* | 5/2019 | King | G06V 30/418 |
| 2020/0151252 | A1* | 5/2020 | Guo | G06F 40/30 |
| 2021/0073341 | A1* | 3/2021 | Liu | G06F 16/9535 |

* cited by examiner

The Gettysburg Address

Four score and seven years ago our fathers brought forth on this continent, a new nation, conceived in Liberty, and dedicated to the proposition that all men are created equal.

Now we are engaged in a great civil war, testing whether that nation, or any nation so conceived and so dedicated, can long endure. We are met on a great battle-field of that war. We have come to dedicate a portion of that field, as a final resting place for those who here gave their lives that that nation might live. It is altogether fitting and proper that we should do this.

But, in a larger sense, we can not dedicate - we can not consecrate - we can not hallow - this ground. The brave men, living and dead, who struggled here, have consecrated it, far above our poor power to add or detract. The world will little note, nor long remember what we say here, but it can never forget what they did here. It is for us the living, rather, to be dedicated here to the unfinished work which they who fought here have thus far so nobly advanced It is rather for us to be here dedicated to the great task remaining before us - that from these honored dead we take increased devotion to that cause for which they gave the last full measure of devotion - that we here highly resolve that these dead shall not have died in vain - that this nation, under God, shall have a new birth of freedom - and that government of the people, by the people, for the people, shall not perish from the earth.

| Brava View | localhost:3000 | gettysburg.docx |

Translations | Pages | Markups | Sear

Japanese

ゲティスバーグ生所

4スコア、7年前、私たちの父親はたこの大陸にLiberty で構想され平等に創造されるという命題に献身しました。

現在、私たちは大きな内戦に従事しており、その国、するかどうかをテストしています、構想されな国親はこの大陸に、献身的が長続きしい戦場で会います。私たちはそのように、その戦争の素晴らLiberty で構想された休息場所として捧げることと与えた人々のための最後のようにに、その分野の一部を、命をにここにちがこれを行らくまでであるということは、全体として適切です。

SYSTEM AND METHOD FOR DOCUMENT TRANSLATION IN A FORMAT AGNOSTIC DOCUMENT VIEWER

RELATED APPLICATIONS

This application is a continuation of, and claims a benefit of priority under 35 U.S.C. 120 from, U.S. patent application Ser. No. 16/919,370, filed Jul. 2, 2020, entitled "SYSTEM AND METHOD FOR DOCUMENT TRANSLATION IN A FORMAT AGNOSTIC DOCUMENT VIEWER," issued as U.S. Pat. No. 11,227,101, which claims the benefit of priority under 35 U.S.C. § 119 to U.S. Provisional Application No. 62/870,856 filed Jul. 5, 2019, entitled "SYSTEM AND METHOD FOR DOCUMENT TRANSLATION IN A FORMAT AGNOSTIC DOCUMENT VIEWER," which are hereby fully incorporated by reference herein for all purposes.

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

TECHNICAL FIELD

This disclosure relates generally to electronic documents. Even more specifically, this disclosure relates to the access and viewing of electronic documents and providing assistance in the translation of such electronic documents. Even more specifically, this disclosure relates to providing an in-context capability for the automated translation of electronic documents in a format agnostic document viewer.

BACKGROUND

The current and future global economy imposes a number of difficulties on those entities that operate within it. For example, in an international entity users often access documents that are not in their native or preferred language. For example, a German-native speaker in Germany may access a document written in American English. This language barrier can impose difficulties within a multi-national organization.

While traditional online translation services are available, these translation services usually only operate within a specific context, requiring the document to be in a particular format only translating that document to another language in the same document format.

However, users within a large entity (or users generally) may encounter numerous documents in numerous formats. The trend has thus been for document viewers to view such documents, where those document viewers may be dedicated (or otherwise) document viewers that may be separate from the native program that created those documents. The use of such viewers has, however, increased problems related to the language issues with respect to such documents. In particular, the use of traditional translation services in association with these viewers may be quite difficult.

What is desired, therefore is to incorporate document translation into document viewers such that a portion (or the entire) of the text of a document can be translated and presented to the user through the document viewer in the context of the document.

SUMMARY

To that end, embodiments as disclosed here may combine a format agnostic document viewer with a document translation service to provide the ability for a user to either select a portion of the viewed document text in the format agnostic viewer and have it translated into a selected language, or for the user to have the entire document presented in the format agnostic viewer in translated form. In either case, the translated text can either be shown side-by-side with the original document text in the format agnostic viewer, or can replace the original text on the visible page in the format agnostic viewer. The translated text may be formatted according to, or displayed with, enhancements to account for differences in the original text or other differences, such as different line lengths or size of the different translations or the like.

In one embodiment, a format agnostic viewer may be adapted for receiving an electronic document in a source format at the format agnostic document viewer and converting the document from the source format to a format agnostic format utilized by the format agnostic document viewer to generate a format agnostic version of the document. The format agnostic viewer can receive a selection of original text in the document and an associated language, wherein the original text is in a first language and the associated language is a second language. The format agnostic document viewer can submit a request for a translation of the selection of original text to a translation service over a computer network, wherein the request includes the selection of original text and specifies the associated second language. This submission to the translation service may be accomplished directly from the format agnostic document viewer to the translation service, or may be accomplished indirectly by submitting a request to another service (e.g., associated with the format agnostic viewer) which then submits the request for the translation to the translation service.

The format agnostic viewer can then receive translated text in response to the request for the translation over the computer network (e.g., directly from the translation service or indirectly from the other service to which the request for translation was submitted), the translated text comprising the portion of the original text in the second language. The format agnostic document viewer can then display the translated text in association with a display of the document in the format agnostic viewer, wherein the display is generated by rendering the format agnostic version of the document in the format agnostic document viewer.

In some embodiments, the selection of the original text is based on a user interaction with the display of the document in the format agnostic document viewer.

In embodiments, the translated text is displayed side-by-side with the display of the document in the format agnostic document viewer or the translated text replaces the selected original text in the display of the document. Replacing the selected original text in the display of the document may comprise, in response to receiving the translated text: locating the selected original text in the format agnostic version of the document; replacing the selected original text in the format agnostic version of the document with the translated text; and rendering the format agnostic version of the document with the translated text in the format agnostic document viewer.

In a particular embodiment, the original text is associated with a displayed non-textual element in the source version of the document and the translated text is rendered at a same location as the original text relative to the displayed non-textual element in the display of the document.

In one embodiment, a conversion rule may be applied to the translated text such that one or more of an orientation, length or character size is substantially similar between a display of the original text and the displayed translated text.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIGS. 4B-4H depict interfaces that may be utilized by embodiments of a format agnostic document viewer for document translation.

DETAILED DESCRIPTION

Figure 1:
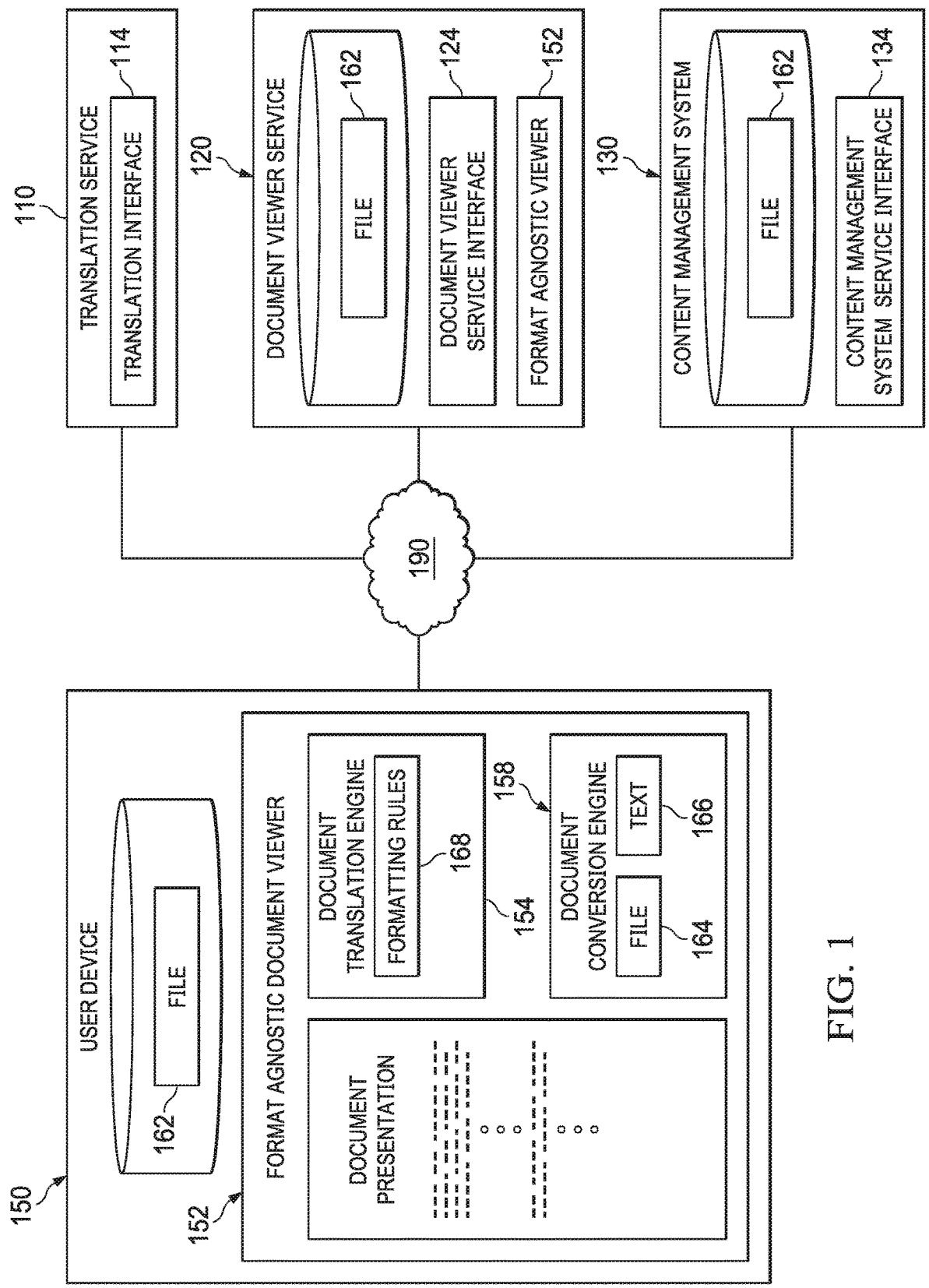
FIG. 1 is a block diagram of one embodiment of an architecture for a system for document translation with a format agnostic document viewer.

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

It should be noted that all product names, trademarks and registered trademarks are property of their respective owners. Specifically, all trademarks, service marks, certification marks, and collective marks cited herein are the property of their respective owners in the United. States or other countries. Each trademark, service mark, certification mark, or collective mark is used herein to identify an article or product, service, or organization.

The current and future global economy imposes a number of difficulties on those entities that operate within it. For example, in an international entity users often access documents that are not in their native or preferred language. For example, a German-native speaker in Germany may access a document written in American English. This language barrier can impose difficulties within a multi-national organization. For example, the language barrier may stunt the collaboration or other interactions between users within the entity or organization that speaks different languages. On an individual level, the language barrier may frustrate those who wish to access and understand documents written in a foreign (to them) language.

While traditional online translation services are available, these translation services usually only operate within a specific context, requiring the document to be in a particular format only translating that document to another language in the same document format.

However, users within a large entity (or users generally) may encounter numerous documents in numerous formats. The trend has thus been to format agnostic document viewers. The document viewers, including for example OpenText™ Brava!™, OpenText™ Core Viewing Service or OpenText™ Intelligent Viewing, can access a document in a variety of formats and apply an appropriate conversion engine for the format of the document to convert the document in the proprietary format to an internal format agnostic version of the document that can be rendered by the format agnostic document viewer for presentation to the user. The use of such format agnostic document viewers eliminates the need to install native applications for every document format on every user's desktop, and allows users to safely interact with documents and drawings without altering the original file. Such viewers thus make it easy to view, annotate, redact, transform, secure, and publish virtually any type of file including Adobe PDF documents, Microsoft® Office documents, image files, CAD drawings, and 3D models.

Specifically, when such format agnostic viewers are downloadable or otherwise accessible from a user's device (e.g., over a network such as a LAN, a WAN, an internet, an intranet, the Internet or almost any combination of wireless or wired network), the user can then access a wide variety of documents virtually regardless of their format without installation of proprietary viewing or native applications on the user's device.

While the window of documents available to a user through the use of these format agnostic viewers is markedly increased by the availability of these format agnostic viewers, the expansion of the number and type of documents available to a user has only exacerbated the problem of the language barrier with respect to such documents (e.g., as more documents in more languages are now available to users). In particular, the difficulty of using traditional translation services in association with these format agnostic viewers usually makes their use prohibitive. In order to translate such a document, the user may have to locate the document in its original proprietary format, attempt to locate a translation service that can translate documents of that specific proprietary format (if one even exists), provide the document in the original format to the translation service and receive the translation in return. In most cases, such a translation service will not accept an entire document in a proprietary format, but will only accept text extracted from the document. Thus, a user must now extract the text from the document, provide the text to the translation service and receive translated text back. The user must then attempt to view and understand the translated text in the context of the document. This can be difficult, especially in cases where the original document is composed of content other than text, including images or other types of multimedia content.

What is desired, therefore is to incorporate document translation into format agnostic document viewers such that a portion (or the entire) of the text of the document can be translated and presented to the user through the format agnostic document viewer in the context of the document.

To that end, embodiments as disclosed here may combine a format agnostic document viewer with a document translation service to provide the ability for a user to either select a portion of the viewed document text in the format agnostic viewer and have it translated into a selected language, or for the user to have the entire document presented in the format agnostic viewer in translated form. In either case, the translated text can either be shown side-by-side with the original document text in the format agnostic viewer, or can replace the original text on the visible page in the format agnostic viewer. The translated text may be formatted according to, or displayed with, some enhancements to account for different line lengths of the different translations.

Turning then, to FIG. 1, one embodiment of an architecture for a system for document translation with a format agnostic document viewer is depicted. A user at a user device 150 who wishes to view a file (e.g., also referred to interchangeably as a document or content) 162 may utilize format agnostic document viewer 152. This format agnostic document viewer 152 may be, for example, a standalone (e.g., desktop) application installed on the user device 150.

Alternatively, the format agnostic viewer 152 may be a web or browser-based application executing in a browser at the user device 150, such as the OpenText™ Brava!™ viewer, OpenText™ Core Viewing Service or OpenText™ Intelligent Viewing web application. In this case, a document viewer service 120 may offer a document viewer service interface 124 through which a request may be submitted for the format agnostic viewer 152 from the user device over network 190 (e.g., a LAN, a WAN, an intranet, the Internet or almost any combination of wireless or wired network). The document viewer service 120 may be, for example, deployed in a cloud-based computing environment. The document viewer service 120 can then deliver format agnostic viewer 152 to the user device 150 where it can be executed (e.g., in a browser on the user device 150). For example, OpenText™ currently makes available a number of cloud-based services, including the OpenText™ Core Viewing Service which delivers such a web application for a format agnostic viewer.

The document viewer service 120 may be associated with a set of files stored at the document viewer service 120. The document viewer service 120 may also be associated with other computing systems or platforms such as a content management system 130 having a content management system service interface 134. Thus, file 162 at the document viewer service 120 or the content management system 130 may be accessed at the user device 150 and viewed through the document format agnostic viewer 152.

In such cases, or in other arrangements, the format agnostic document viewer 152 at the user device 150 may allow users to view documents regardless of the original source format of the document (for example, Microsoft Office™ documents, Adobe PDF, AutoCAD DWG, etc.) without requiring the original document's source (native) application. In particular the format agnostic document viewer 152 may include a document conversion engine 158, for converting a document 162 accessed through the user's device 150 (e.g., stored at the user's device 150, accessed at document viewer service 120 or content management system 130 or another system, etc.) into a format agnostic version 164 of the document.

This format agnostic version 164 may be a proprietary format (also referred to as a format agnostic, or document agnostic, format) specific to the format agnostic viewer 152, such that the format agonistic viewer 152 is adapted to render the format agnostic version of the document 162 for presentation to the user. This format may be, for example a Scalable Vector Graphics (SVG) format or the like. As part of this conversion process, the original document's text or other content 166 may be extracted and made available to the format agnostic document viewer 152.

Format agnostic viewer 152 may also include document translation engine 154. In one embodiment, the document translation engine 154 may interact with translation service 110 to translate a portion (e.g., all or a subset) of the original document text 166 to a language specified by, or associated with, the user.

Translation service 110 may be an associated with a third party web service offering a translation interface 114 (e.g., an application programming interface (API) or Representational State Transfer (REST) interface) through which text can be submitted along with a request for translation to a desired language and in return, the translation service 110 will return text translated into the desired language. The translation service 110 may be deployed in a cloud-based computing environment which may be the same as, or different, from any cloud-based computing environment in which the document viewer service 120 is deployed. For example, the Google Translate API https://cloud.google-.com/translate/docs/can readily receive text in one language, and return the text translated into another given language.

Thus, the format agnostic viewer 152 may present the ability for the user to specify a language through an interface (or otherwise determine a language associated with a user, such as the default language of their operating system, etc.). The format agnostic viewer 152 may also provide the ability for a user to select a portion (including the entirety) of the original text of the document being displayed in the format agnostic viewer 152 for translation. The user may also be given the ability to select a display format for any translated text, including, for example, showing the translated text side-by-side with the original document text, or having the translated text replace the original text on the rendered document.

In some cases, a translation service 110 may require payment or a payment type to be submitted with the request for translation. In these types of instances, format agnostic viewer 152 may provide the ability for a user to provide such a payment methodology (e.g., referred to as a personal Translation API key) such that it may be submitted to the translation service 110 (e.g., in a request for translation).

Once the portion of the document selected by the user for translation is received by the format agnostic viewer 152, the format agnostic viewer 152 can determine the original text (e.g., in the original language) of the selected portion. This determination can be made through reference to the format agnostic version 164 of the document or the text 166 of the original document that may be determined and utilized by the format agnostic viewer 152.

The portion of the original text can then be submitted by the document translation engine 154 to the translation service 110 through the translation interface 114 in a request to have the text translated into the language associated with the user (e.g., the language specified by the user or otherwise determined). Translated text can then be received in response to the request from the translation service 110 at the document translation engine 154.

It may be realized that in certain contexts, such as enterprise environments or the like, there may be many users on many user devices 150 that desire to utilize a translation capability of format agnostic viewer 152. These users, or the enterprise including such users, may not wish to deal with administrative or computing issues (e.g., authentication, access, payment, etc.) that may be required for utilizing translation service 110 directly from the user device 150.

Accordingly, in certain embodiments, the interaction with translation service 110 for obtaining translated text may be accomplished through the document viewer service interface 124. Specifically, the document viewer service 120 may offer the ability for an enterprise to specify that associated users may utilize translation capabilities provided by the document viewer service 120. Document viewer service 120 (or operators thereof) can then establish a relationship with translation service 110 such that document viewer server 120 may obtain translation services through translation interface 114 (e.g., by establishing an account, obtaining a key or other authentication token, providing payment information or the like). Document viewer service interface 124 may thus offer an interface (e.g., a REST interface or the like) through which requests for translation of text and an associated language may be submitted. The document viewer service 120 can then submit a corresponding request to the translation service 110 through translation interface 114 to have the text received in the request translated into the language specified in the request. Translated text can then be received from the translation service 110 at the document viewer service 120 in response to this request. The translated text can then be returned by the document viewer service 120 in response to the original request.

Thus, in one embodiment, when a user interacts with a document displayed in the format agnostic viewer 152 to specify a language and select a portion (including the entirety) of the document being displayed in the format agnostic viewer 152 for translation to the specified language, the document translation engine 154 may interact with document viewer service interface 124 to submit a request to have the text translated into the language associated with the user (e.g., the language specified by the user or otherwise determined). Specifically, the document translation engine 154 may submit a request to document viewer interface 124 to translate the selected portion of original document text 166 to the language specified by the user. When the request for translation is received through the document viewer interface 124, the document viewer service 120 can submit a corresponding request to the translation service 110 through translation interface 114 to have the original text received in the request translated into the language specified in the request. Translated text can then be received from the translation service 110 at the document viewer service 120 in response to the request submitted to the translation service 110. The translated text can then be returned by the document viewer service 120 to the document translation engine 154 of the format agnostic viewer 152 in response to the original request received through the document viewer interface 124.

When the translated text is received from the translation service 110 at the document translation engine 154 it can be displayed in the format agnostic viewer 152 as specified by the user. For example, the translated text may be shown side-by-side with the original document text in the format agnostic viewer 152. Alternatively, or additionally, the translated text can replace the original text in the rendered document.

In cases where the translated text replaces the original text, as what is being translated and replaced is the text, the translated text may be displayed and associated with the same (e.g., non-textual) elements of the document that the corresponding original text was associated with. For example, the translated text for image captions that were selected for translation may be rendered at the same location relative to the image as the original text caption. In this way, the document may be rendered substantially similarly to the original document, with the main difference being the desired translated text as specified by the user.

In some cases then, to account for differences between languages, including orientation, length, character size, among other differences, conversion rules 168 may be applied to the translated text before replacing the original text with the translated text. The conversion rules may be selected or determined based on the original language of the text, the language into which the text was translated, or both. For example, the conversion rules 168 may provide enhancements to the translated text to account for different line lengths of the different translations. For example, compared to English, German takes on average more "characters per thought" so lines of text tend to be longer in German than English when expressing the identical ideas. The conversion rules 168 may account for differences such as these.

Figure 2:
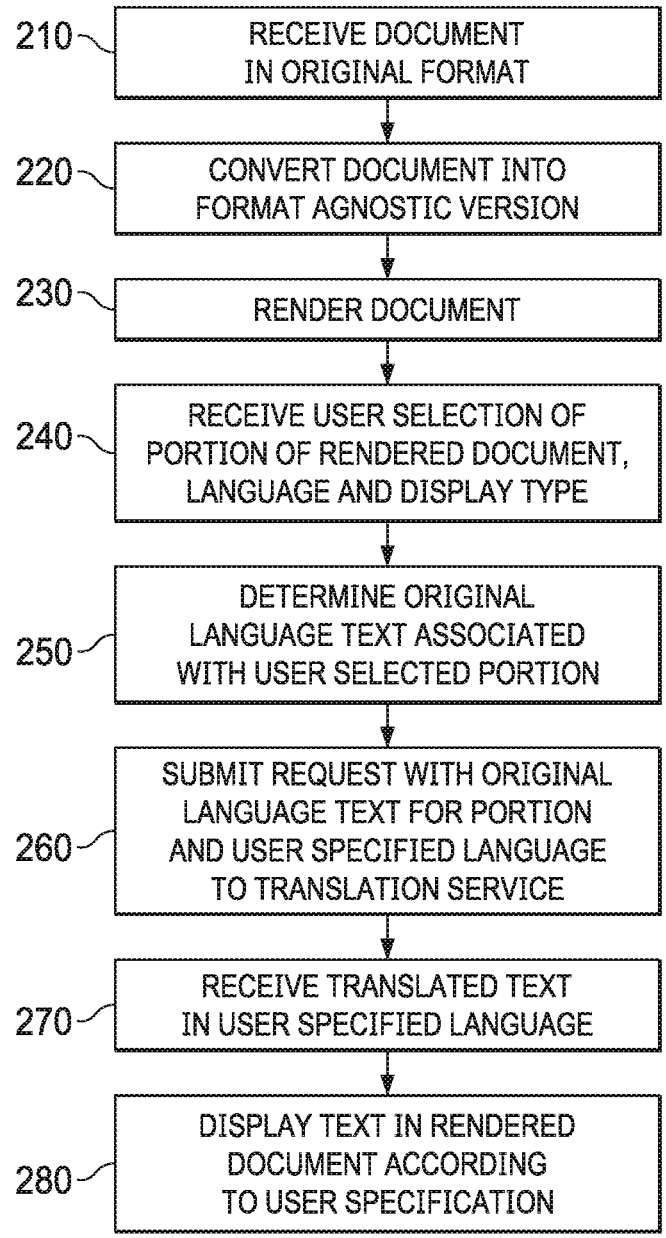
FIG. 2 is a flow diagram of one embodiment of a document translation method for use with a format agnostic document viewer.

Turning to FIG. 2, a flow diagram for one embodiment of a method for translation in a format agnostic document viewer is depicted. Specifically, a user at a user device who wishes to view a file may utilize a format agnostic document viewer that may be, for example, a standalone (e.g., desktop) application installed on the user device or a web or browser-based application executing in a browser at the user device. The format agnostic document viewer may allow users to view documents regardless of its original source format without access to the source or native application.

Accordingly, at step 210 a document may be received in its original or native format and converted into a format agnostic version of the document at step 220. In particular the format agnostic document viewer may convert the document at the user's device into a format agnostic version of the document. This format agnostic version may be a proprietary format (e.g., a format agnostic format) specific to the format agnostic viewer such that the format agonistic viewer is adapted to render the format agnostic version of the document for presentation to the user. As part of this conversion process, the original document's text 166 may be extracted and made available to the format agnostic document viewer.

The original document in the format agnostic proprietary format can thus be rendered by the format agnostic document viewer to present the document to the user through the format agnostic document viewer at step 230. The format agnostic viewer may also present the ability for the user to specify a language through the interface (or otherwise determine a language associated with a user), and provide the ability for a user to select a portion (including the entirety) of the document being displayed in the format agnostic viewer for translation. The user may also be given the ability to select a display format for any translated text, including, for example, showing the translated text side-by-side with the original document text, or having the translated text replace the original text on the rendered document.

At step 240, then, the user language (e.g., the language specified by the user or otherwise associated with the user) of the user selected portion of the displayed document and the display type may be received. Once the portion of the document selected by the user for translation is received, the original text (e.g., in the original language) of the selected portion can be determined at step 250. This determination can be made, for example, through reference to the format agnostic version of the document or any text of the original document that may be determined or extracted from the original document and utilized by the format agnostic viewer to, for example, produce the format agnostic version of the document.

A request for the translation of this original language text of the selected portion from the original language to the user specified language can then be submitted to a translation service at step 260. Specifically, the translation service may be an associated or third party service offering a translation interface through which text can be submitted along with a request for translation to a desired language and in return, the translation service will return text translated into the desired language. The portion of the original text can thus be submitted to the translation service through the translation interface in a request to have the text translated into the language associated with the user (e.g., the language specified by the user or otherwise determined).

As discussed, in certain embodiments, the interaction with translation service for obtaining translated text may be accomplished through another intermediary service such as a document viewer service interface. Specifically, in one embodiment, a request to have the text translated into the language associated with the user (e.g., the language specified by the user or otherwise determined) may be submitted to a document viewer interface of a document viewer system to translate the selected portion of original document text to the language specified by the user. When the request for translation is received through the document viewer interface, the document viewer service can submit a corresponding request to the translation service to have the original text received in the request translated into the language specified in the request. Translated text can then be received from the translation service at the document viewer service and returned by the document viewer service to the format agnostic document viewer in response to the original request.

When the translated text is received from the translation service at step 270 at the format agnostic document viewer it can be displayed in the format agnostic viewer as specified by the user at step 280. For example, the translated text may be shown side-by-side with the original document text in the format agnostic viewer. Alternatively, or additionally, the translated text can replace the original text of the selected portion in the rendered document. In cases where the translated text replaces the original text, as what is being translated and replaced is the text, the translated text may be displayed and associated with the same (e.g., non-textual) elements of the document that the corresponding original text was associated with. In some cases then, to account for differences between languages, including orientation, length, character size, among other differences, conversion rules may be applied to the translated text before replacing the original text of the rendered document with the translated text. The conversion rules may be selected or determined based on the original language of the text, the language into which the text was translated, or both.

Figure 3A:
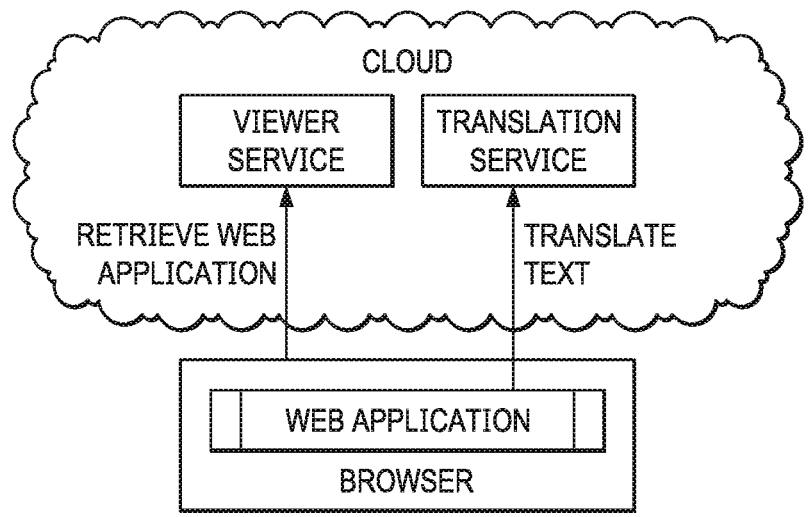
FIG. 3A is a block diagram depicting an embodiment of a computer network architecture for a browser-based format agnostic document viewer.
Figure 3B:
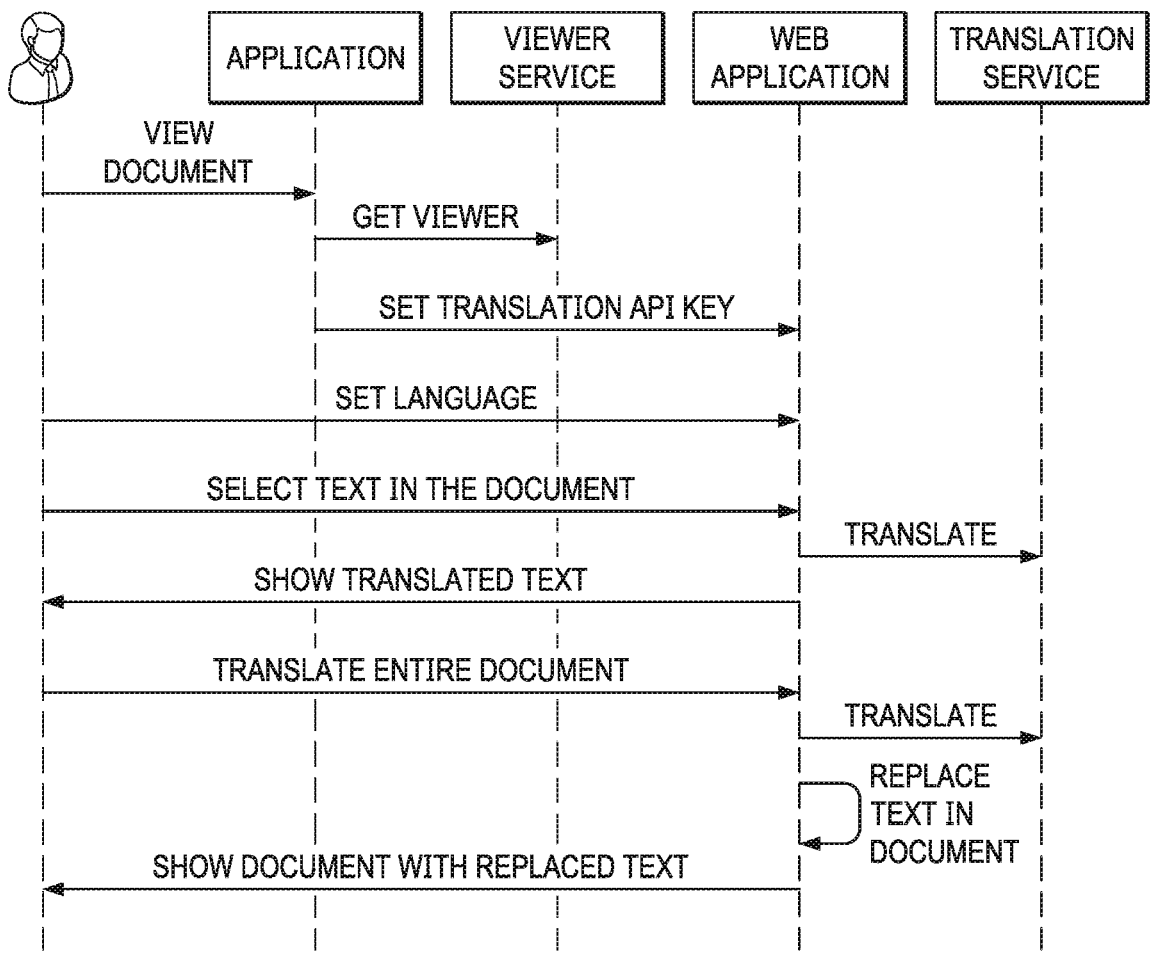
FIG. 3B is a flow diagram depicting two potential translation activities of embodiments of document translation in a format agnostic viewer.

Turning to FIGS. 3A and 3B a depiction of particular embodiments of a system and method for document translation in a format agnostic document viewer are depicted. Specifically, FIG. 3A depicts an embodiment of a computer network architecture for a browser-based format agnostic document viewer as provided by a viewer service that offers a document viewer service interface through which a request may be submitted for the format agnostic viewer. The document viewer service may be deployed in a cloud-based computing environment. The document viewer service can then deliver a browser web application including a format agnostic viewer to a user device where it can be executed in a browser on the user device.

The browser web application including the format agnostic viewer may interact with the translation service to translate a portion (e.g., all or a subset) of an original document text to a language specified by, or associated with, the user. Translation service may be an associated or third party web service offering a translation interface through which text can be submitted along with a request for translation to a desired language and in return, the translation service will return text translated into the desired language to the web-based application including the format agnostic viewer. The translation service may be deployed in a cloud-based computing environment which may be the same as, or different, from any cloud-based computing environment in which the document viewer service is deployed.

Moving to FIG. 3B, a flow diagram showing two potential translation activities of embodiments of document translation in a format agnostic viewer is depicted. After the user loads the format agnostic document viewer as a web application (which may be accomplished after an interaction with a user application and a Viewer Service) and the user provides any required personal translation API key (if needed), and sets a "target" language, the user can view translations in at least two ways. First, by selecting some text on the page they are currently viewing (e.g., with a mouse or some other pointer/gesture or interaction) the format agnostic document viewer web application translates the selected text via the translation service and shows the translated text to the user (e.g., via a dialog box or on a side panel of a user interface). Alternatively, the user could ask the format agnostic document viewer web application to translate the entire document. After receiving the translated document text, the format agnostic document viewer web application could either just show the translated text via the same dialog box or sidebar panel, or it could replace the text on the page and for example, preserving any charts or graphical images embedded on the page and adjusting the page margins to account for different line lengths.

Figure 4A:
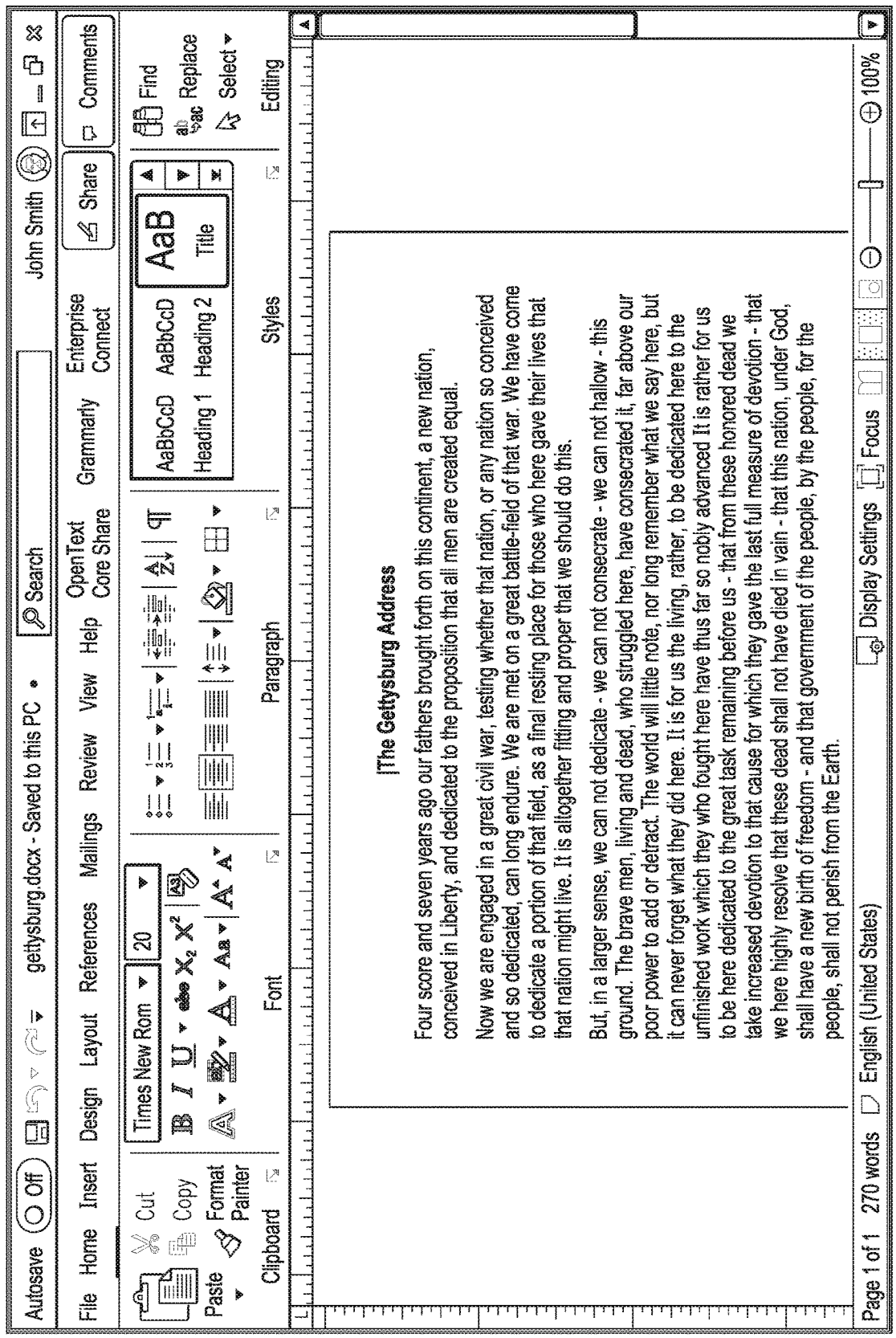
FIG. 4A depicts a presentation of a document in its native application.

It may now be useful to depict embodiments of documents, document agnostic formats and interfaces that may be utilized by embodiments of a format agnostic document viewer adapted for translation of document. Referring first to FIG. 4A, then, a document (e.g., in .docx format) is depicted as it is presented in its native application (Microsoft Word) in its original language (English). FIG. 4B depicts an embodiment of an interface of a format agnostic viewer displaying a format agnostic version of the document of FIG. 4A in its original language. The content of the format agnostic version of the document being displayed in the interface depicted in FIG. 4B (e.g., in SVG format) is included in APPENDIX A.

Figure 4C:
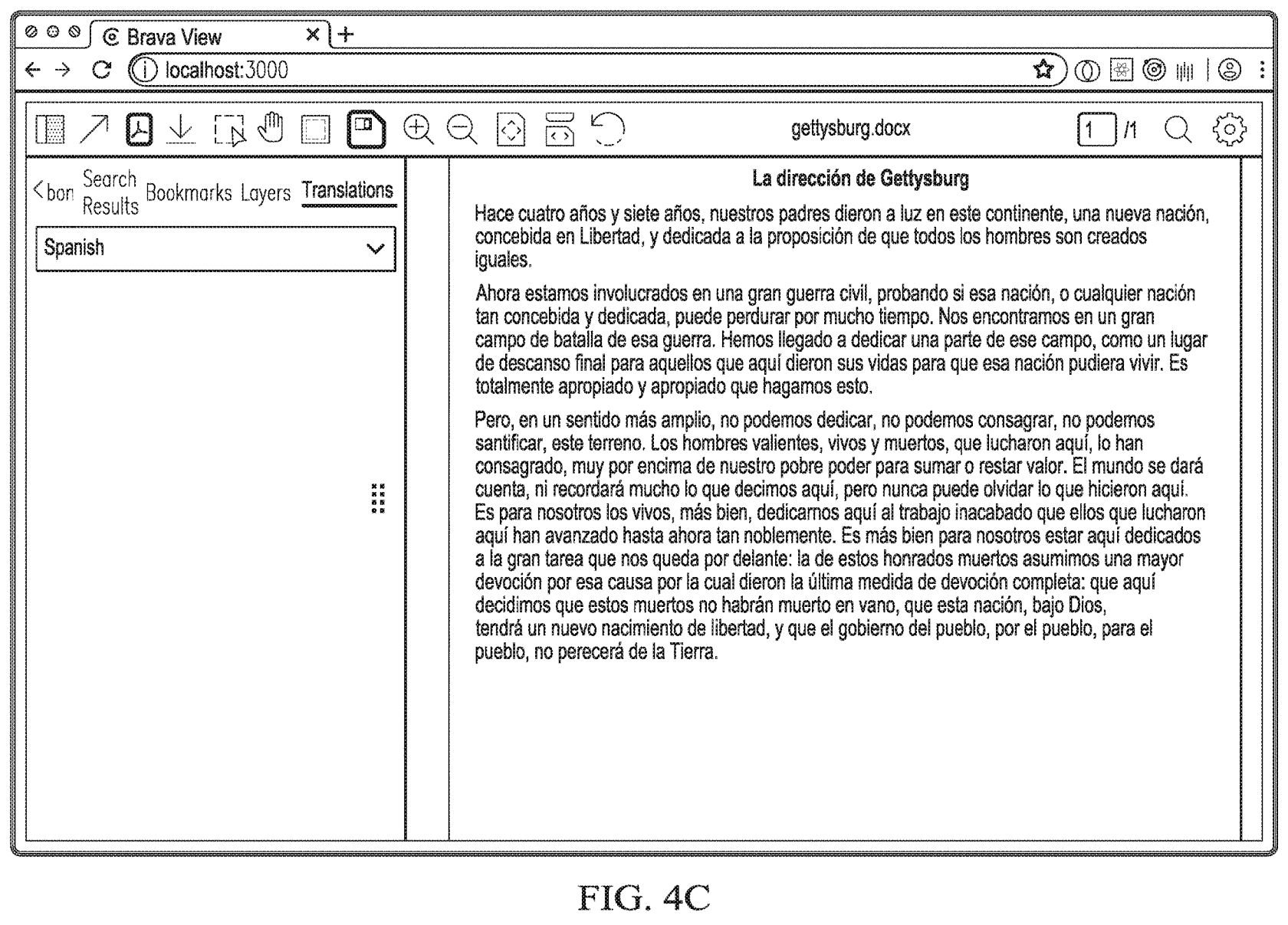

FIG. 4C depicts the format agnostic version of the document of FIG. 4B with portions of the document translated into Spanish. The content of the format agnostic version of the translated document being displayed in the interface depicted in FIG. 4C (e.g., in SVG format) is included in APPENDIX B.

Figure 4D:
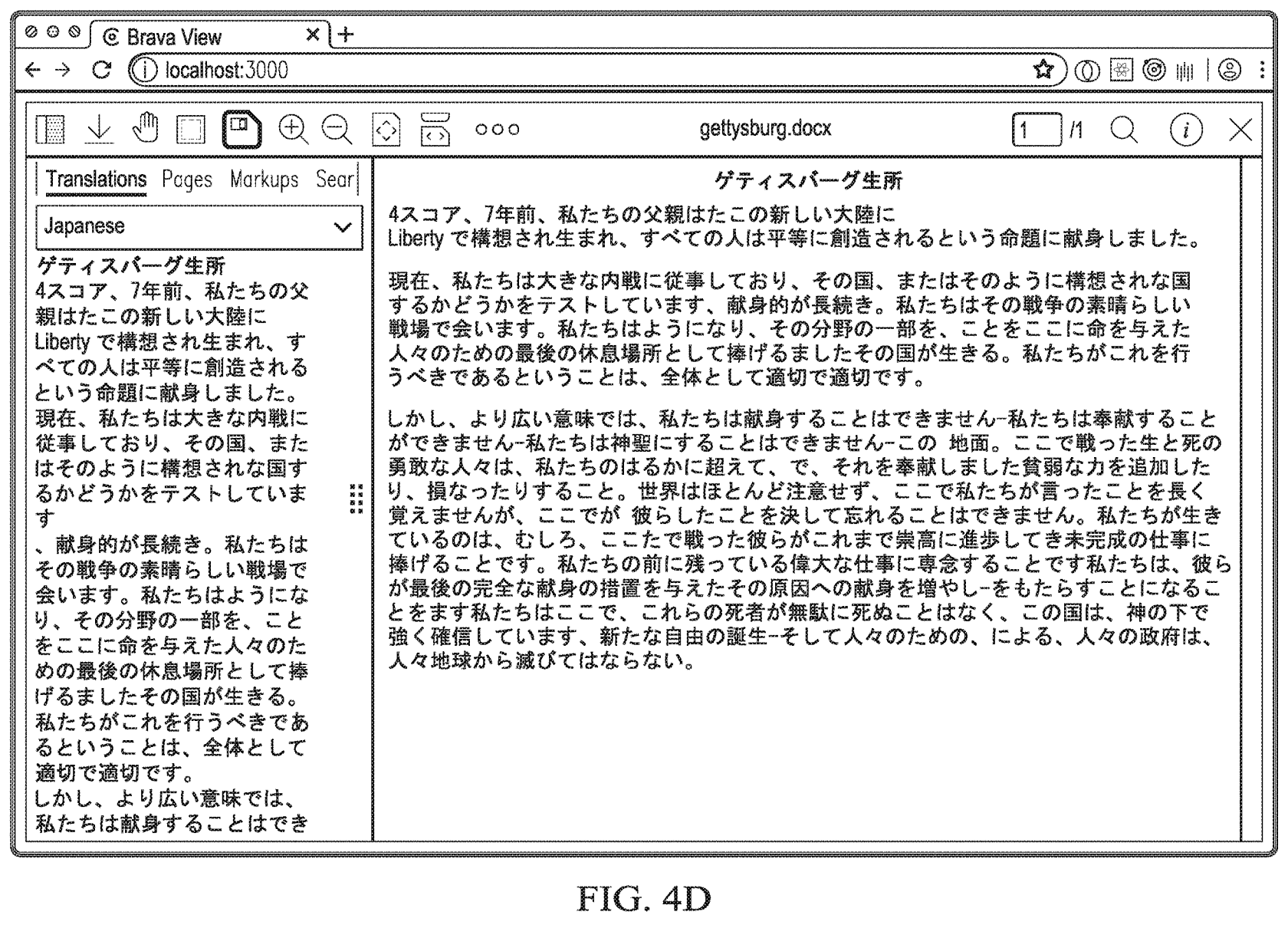
Figure 4E:
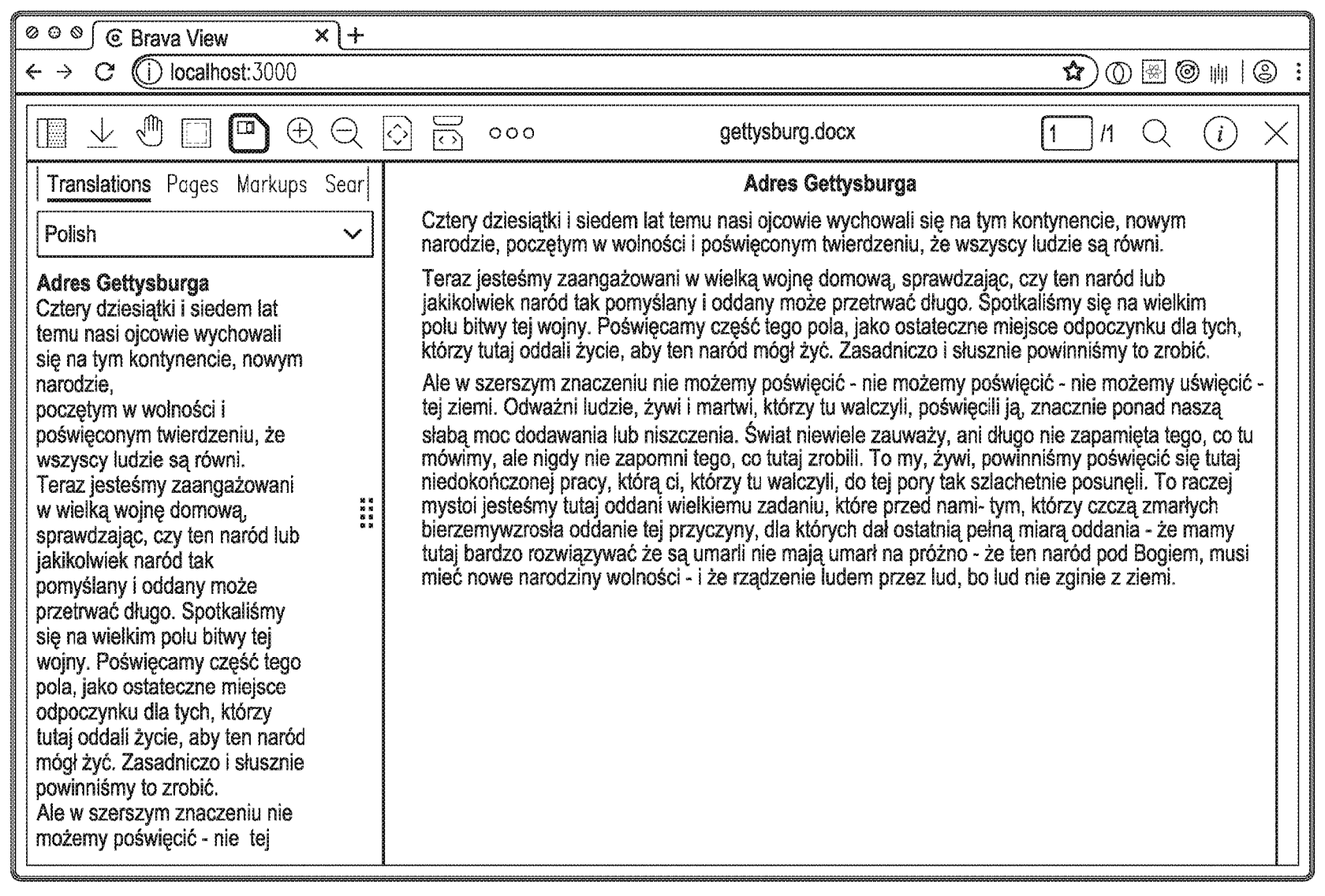

FIGS. 4D and 4E depict embodiments of interfaces displaying that document of FIG. 4B with portions of the document translated into, respectively, Japanese and Polish.

Figure 4F:
Figure 4G:
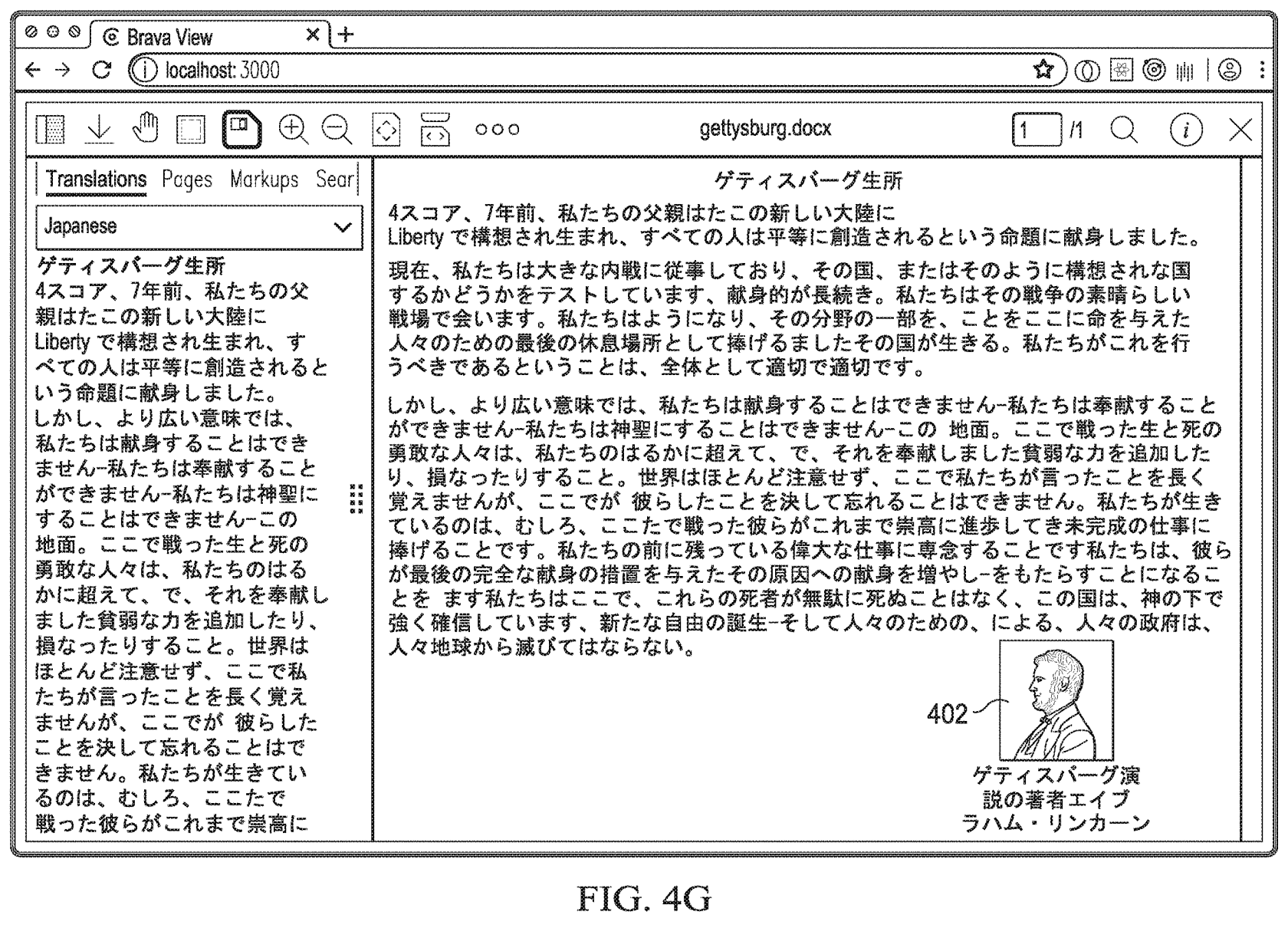

FIG. 4F depicts an embodiment of an interface displaying a format agnostic version of a document in its original language (English), where that document includes a graphical image 402 and an associated caption. FIG. 4G depicts an embodiment of an interface displaying the document as displayed in FIG. 4F translated into Japanese. Notice that in the embodiment depicted in FIG. 4G the caption for the graphical image 402 has also been translated into Japanese and the translated text for the caption is displayed in the same location relative to the graphical image 402 as the corresponding original text associated with the graphical image 402 in the embodiment depicted in FIG. 4F.

Figure 4H:
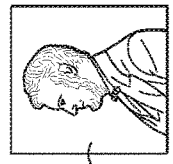

FIG. 4H depicts an embodiment of an interface displaying the document as displayed in FIG. 4F where only the caption for the graphical image 402 has been selected for translation by the user. Notice that in the embodiment depicted in FIG. 4H the caption for the graphical image 402 has been translated into Japanese and the translated text for the caption is displayed in the same location relative to the graphical image 402 as the corresponding original text associated with the graphical image 402 in the embodiment depicted in FIG. 4F.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention.

Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein and throughout, the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure.

APPENDIX A

@font-face { font-family: "f_cb3bed65463c82aa540d";
src:url("data:application/font-
woff;base64,d09GRk9UVE8AABOYAAoAAAAAGiQAAQAAAAAAAAAAAAAAAAAAA
AAAAAABDRkYgAAAA9AAAD3MAABPtS3CQY0ZGVE0AABBoAAAAGgAAABwyNsvxT1Mv
MgAAEIQAAABPAAAAYHgrflVjbWFwAAAQ1AAAALEAAAGiyD6hDWh1YWQAABGIAAAA
MQAAADYaJV7eaGhlYQAAEbwAAAAdAAAAJAj/BANobXR4AAAR3AAAAR3AAAAJEAAACcZ0oF
PG1heHAAABJwAAAABgAAAAYAJ1AAAbmFtZQAAEngAAAEMAAACRvKhCVJwb3N0AAAAT
hAAAABMAAAAg/4YAMnicjVh7eJN11v9KyZdvQKIjE3Z2raAOq67KKMIIAu4oF5WL
oFBoKXJrm7a0JUlzvilbFDhtmnvSXJprm6YXeuFaoK22ioqMyuPo6u407sjozD7u
4zgzOm+6b/rsvknBKQ47a/J8yR9533N+57y/8zvnTQE1ezZVUFAwfydfckhSz6tc
smLZk0tXLH9y5XKqYBZVQD2SuZ3K3FWQKZqVubsw83ezAQ8Xzf7mv9eyiqjm24so
6o4i6uMfF1FFRfNr7qQKcztup+611q0T8Q5KeJX31Cvv2fjcur82fgt35FVAzaM4
xMB91E+o+6kHqAeph6gl1KPUz6iV1FpqHbWe2kA9Sz1HPU9tpDZZRW6gXqK3k3UNupF
6iVqO7WDKqZ2UruoEqqUKqOM1AMSL1uJERFloHoKlha8Nev+WabCuwoPFU7MXj7b
wVrG+hNdTv87ex37VWblD3xz7p3mbT1r7bHbym+7Nm/rvF9wmtP+9fbEHYV3m0/4
6ofJO1fd+RR+CUYyG0/OYKRkbQKyOFlwsy6czibJqN/zjCRa9kNuBXaA7u5mSXDeAX
uaPsj5JDA3AefFa3yWlyGh16u8FhcJnclo81AGGIu8IBHxPwR5wx6ICosV0ZVnoa
oAbwvOfX4L+vZIDNwZe60Qnub9GVR/EVNic7Hy0xcUtEgYnxZGpsUQTC1oA+qHdJ
oR7qzVK1XqNTWuSQ24iegdmjcXYCwg6f3+vzdwSGGJSYrPOCUNfUUZZb5FX5jH5T
uCkBTLAUfzbaRV9IRIYWgQOcR51HXUdcR9xMGbobfwB78Y9Y2nmlCtRMRaf81YWp
UjxKozj6hou64G1UW/0HlqHb3N3YZeU3CoxCk9BQq+UxK7GUxbl6bsFogJ2ChL3d
E/F6EjDIZL5gQ78xLnfLPWK7EBjNGPo3GvG+XovvXwSP7N58fy1jZY8bz0qOV/VX
h0phM4OX3rcG8xZmKRqZMxnuJ/T7cMHX0dHZ6T8FF+EN7Ul+TBAv8z4LzJP4X+js
z2ejufR7cMGf0uzqbBuGy/C27rww3dBdFlgHDJ6XnUVz8rA6CayIO+LxxKCfyfwX
G4aMCblHQWAJcrAyWdqBazeDZYxlfqeqdwvZexB/hM5vw+ers5CBHoSUJxQJR7yJ
1g7G/colMOHaqfuAxem8hfU/tDfoGdaPpAwJVbs6InTziI+9+Bt0/kV8Hvtp4HnE
7YaIMWHtBOZkgfYOmoNUGZ2uewTWhLcM4ts/2Ip+DGgbXAt+3PPOOe+gn6M30Rb4
HN7VnWk42xCrBcKhBoNMqpGqQxGxrrAJLWpCEhGS9LrQVcDA/j+YDdgDnxJcObmPE1
X9WhB4MxW8QWSjNo97eAJTnAl1F0pbSJFoPcqjaojSYx8BgsZK/iLVU+mOcbbrzF
UX/+3ZwiVKKmhSC2yoOKo1FM8GXJmplhEi6i6+fz/WxJiC25ySiBambqSWQhjI/Y
A96Az+t3hZwhe6glzPh/mzucYP5wkPt7UVJMZzZNrYTMIOumX9jRj6J0SDS27YGcFU
w3j2dt9kMWTfYghPLY60UOLWVD6UiztnTbTbR5wWjqaZjpMrsJz2DUgMmrlWrlZORk
LCVbwIFqJ9dDnhXMWMVZTpymujegiDZ5qwoq5U8vpm4vyn8nTIXEOflcDiyaMsU9lY
0rl1bmWrOA/zNyUCUkysqFwEFjC3NNoAaW8wtRgaxsnexPNWeKne1u8ZV6+SHPw99
EBhn0D9MoctALcl2sLzlnko3z131qrULnV3obmePg9fd/7yXqQWU4rj5W8IovREY
wRgaLRHTE1BYdAatQd9gKGdwxVQtngV4z+QzeNvUM5hF8u1ErXpuMewlVnXX9Cgv
wDtwOX7+bPe57ivh/7QxX7XCL1nQdbTDGPGjSGVX90MchyC7XBIpt9vIR+RQSMh
EDmUPkbpM7dDipRcLBIe6L0U/Aw+hAn1QP1AXbgY/Y/pkh6giHHBKv3qdrt5D02Erx
Slr+tRFYkolKlaplKQqt1Cg1Cqy1ObqmPuReg8PBPBrnRXd+AkjDHw+6eaWM8e2aMR
ihpEumrYw/y8l/eLhYTXcyzeu4T8MLlxivcZMog+wSUaAox5gdc4k0ORiNhyfUS3G
MSTFUhqqjvGOVhyTg+aYibHTY+YFQ4OhSrig1szwODVI3FLCzFipXka9UiYMs/5t4z
h/Mc+lLPxVt/imYjCVJ+jmi0aAJvzjEdq+hrf6N/XFIlUPrWdct/HXgwyFmSpq/+KkzZ
1HEaqj2SiDHHS1K/nlJcQevQLAvJPE/M50v4skrDnpyHyMfce+dw+0hPeu7jsKFr
98Xdr4uuwjeQC5ONNsSLH8Jb4bNlwWXwtPMTsyD7Mbn48Cd0V1xRn4RTkG/Ox1K
h2KRQMx+1G61N9TNNjMYGFCbWVqFIlW1enqqBWWVvCu8InMvF/XRaPH+9x9fuBTK
1pnw4rxKze1dMBok1R+3Rzzt16t/Py58HRW+wYZJtk8MDQ0NjkXXegbfhrCmpTqr9
cmgAmVGII Cv0YuthYjxhjekjhqjMUw/VINbphDqhpRKJKmPXo6Zfw09n9N8vZudIs
h+YoOXE8TFi0JXiw+0CP7DRMwLnAQHcynegPnnSqXWQfNqgNNZIxgNh3rH1hfzgS
TgVrAsKEolfeZxqAk3ClFXzwxNDJ1ylfAZOGzqYOc4e53eQ1eP3BtmgwEkw4CSXJ
QODT+fQODSgZUFklBp1Rr7ZIADp1bUJy5qomtbFN5ZZ5ZJR5JKz9qGNim3F1dceD1
5xVLXfpmQ7O05h5dXXJBxQmM3uE1uc7Sph3B11Y3+4Z2tcN4i2NBQxKu85OCTc1yY
S3Rn5ir3BKRR8wWQo6RqEV2DcdELVqc4Q+CugEgQ6IVaIN1FVAMQMbl5IFBal9EO5
feJsnPs6nHH0+nt8sbaA/5o85OqALBxxJmV/mr3eUE8m7jYY1L7JjMireo9Vq1TmUR
Qx2IWqVupVsR1MSNcX2P9VSeuh/GFox62P9/RcZo0JBaVB3THNMeMzDHVA5gDXxw
ceATEuLi91fjZYvwKXZOZcOG0DSbW0VxoxcwqGs3eN/H4wt3AU4irxdX6PbCNwV42
4b2U8N5N50Y+Wvyy3PA3AhHZPhrkk0Q6dV+u1 REhQI/HkOWiHoLXNQCpPQaqX3yjXGhit
QW1R5Nn61FSYS1jZmWPltxPDj3M9KSb3XA+gaQwJsm30dxvM72nOhe8XfbaeBsGx
+qM1x1QkB3pSOGgJWsPq6ArH3UF3wN4GXvBaHUabyaZpkQEzhuIbcFRGoFcIOcL
6qqZnz2EVmArK1oXFUVUVXClNdZNV0Fh5slNkmLwq52qt0anyaoDahjqk4GclDx
0ucAz2LdKlWXggvyQf8N3KSPpqae6v52DZgSdqeqbLuSYPewJe135Qr6TpMwUU3qU
Hmlu95ExtIMOPkAOOTmcSqfbutv6nANECo+be1Q9qoQgUM546MRwV7q3rbftHuHMQ
3oILuO8fl5oG6xgrlMhZAgbY9uufEffUQHGjCcVaUW6NvAyblHyevkLZmHTYahl
cPSW1Jm5vhr4RLd5hxTbYcl MAiWsHTey8mVf7jBz+vSX6WQ6LDkjK5+UxjFUNh1W
Bwmru62HYCdFhe5+dwaDgwRGLJcuxw0G759YurCKAJAqKmrl22H1 NAA3AdA+fSyO
PIBgTp+XwbOp0onSCdGvAbEBSb8g3aAYrsF7gpEdo8XJJwDTDFY8TDrXDtIjWy5x
34QzicRw8pzvCpk+P9e/2zAsGj4Q3wpb4YBEtFe0V/8cPMbAY74NHS8n954Wv5kv
W0+MiOIN6noJ7/MUWHEz7wkFamkfLrQD62/1z+sd2kq3SJpFzcJmItrkuoJ/wM43
J9NM5mWKEM612j+j/8n5PzE9CxL/7pz/r9ngbw5BpDkCkdxnc7DFz1jom3rZ/9EI
IfYFKgUoIUOHACQWMpZOz8lTK26guNEiyRWkgYAg7fDREwtGW29x3jdX/kt0HHPI
gXuSvpgv4ouEguTDl3L0w1noNUc1MY1XCnwQmWQqNa7nN8S8c3lAL3WpDFGDKhdYjgI
9XXSzapd5h2wncHFN/OurxR/Q6rxbuTRc7dCmbcqWh1X9JCGSSyrL5XP7PG5fq8/u
tXkADrir2g8zkcN9mhE4DX1kFEtEfJ3QBxFryOQ3+zU+nV/qqw9WhJjyceE11EBaG
5VFdXBtv7H1J+GI+ePtV1KjORe1/c2s4Y01ImLQk2wGGQkgGu02iljUKAT2tObyB4
D5uUSpXCJAE+A/VccVyVUA8pXpWeUfYpOpWdqojMJ/GLHXxw4BJule/bVMfvrtqvX
Td9DQmhYz30B9rfxU4KU9gJcYTKP/PQCOwBBW8gRdgY9bX5/wBt2Rz0xZ4gjzUzg
f0LL1+Pl2cfo1d0Vby0MgB98Lf5m8tiYnWyjVd0ky72PTt+rP0Wf6rmbYhe4ZrBm
UPUmfMKgc7dQ6tU07HKXh/lhfp/mArwKQ+HEQLLLfdx4uMsjOhkFjQpFPb7xBcXx+h
vyuRu2j112SIatjHr6/VHtJWNVbm/UfQ2QV4d6afZeowhHQuvVthb8iJ9cUSNbtM

APPENDIX A-continued

```
JCfzfmNzYwt5bGabibmK1SzvYU+tt5pJPsFqDbmTvl5m4HfXkInV8aFkcC0w5jHU
Rm40ElBa9DqDXttAru54V9ZB+juLk6GQfQFePsOb0i7OIx4ndy8xKJt0jWqTReao
sRlbTMTfa/ggyy63Sx1iu9ghaZU4ZDalTcfY6Naoo9PT4+n19HjTDJqfYX0EiIOn
WA65U+YUh8o8lY7DZJnzVPCN5EfMm2g3y+a1eZt95HGDkzkhjOxceB0qcWvR6fUG
XYO+gsFLs44HAa/OuPDarOvh3IXjHKnq19jjcNZ7PHppYPi99B8ZLMt0swwd+pDB
ZSAhSPIhDJccoaczprVpnGrmN5jPaqsPHAzucspaVTadI+5MuDs8Ha6kO8H8imQs
RTL2dH6rq6QpD0NPc0jyGdua9bJk2+R75FVynowvlollh7XV5mrzvqadpP3m/xWa
PPqjyQ1cvW9ysReVkwmQxsPAhtvmFFFF861ZBQWPVn41cg2tXwS/1l+WnJacqYwV
w2Y4IBUfkBzUb4R18IRvU3xfYt8Zyds5Jsx9G85E46cTp72XiTL/h+Gy+KxkeH98
E+yESolkr2SfYSM8wcBy7+b4/viBIdl4ftP/As+e3NQAeJxjYGBgZACCGtUNDSD6
NkfvDhgNAD1wBiMAAHicY2BhWsX4hYGVgYGpi2kPAwNDD4RmfMBgyMgEFGVgY2aA
AQQLCDLTkxkYDjAoMCxgVvhvwRDFvI5RFSjMCJJjmsCcCZRRYGAEAILjDGwAeJxj
YGBgZoBgGQZGBhCYA+QxgvksDA1gWgAowsOgwKDH4MTgzuDJ4MPgxxDCEM6QyVDO
UMmw4P9/oCoFBhOGRwZXJN1EhmyI7P+H/6/9P/L/0P+D//f/3/d/5//t/9f9X/t/
zf82qI04ASMbAyElKPJMzCyYCliBhrBzcDJwMTBwA70BArwMDHxweX4BQSFhEVEx
cQYJSSlpGVk5eQVFJWUVBlUCFpMM1MjSBQDWkyeXAAAAeJxjYGRgYABire8H6uP5
bb4ycDO/AIow3Obo3YGg/91m+cq8DsjlYGACiQIAZywM1lQAAAHicY2BkYGBe9+82
QxQrAwiwfGVgZEAF6gBpAwQMAAAAeJxj/MLAwDgbiIUYVBmrGeQZjRh8mOMYGJhZ
GPSZvgLxGQZ95ukMbowHIXzmjUD6HYMkKwMDN9MOBlumgwxiTLkMzswyDM5MU4DY
ikGRaT6DDNMfBjHGyUD6EZCuZhBgaWZQYhZhUAKqd2bazSAAVh/KoMGkwWDOuJJB
nJkDqPYoAyuLLAMj0FxWkJsASr4Z2gAAAAAAUAAAJwAAeJylj7FOAkEQhv+Fg4SG
GDoTY7agdMnuQjiOlgJpbAy0BriVbEKO5LgGa30dH8WX8QX8PaYw0cLoJjPzzcw/
O7sAuniFwvl0cS2s0MO9cAMdPAk30cebcIKeuhRu4ULdCbdZf6FSJR1mV/XUJyvO
GuEG738UbuIWz8IJNe/CLWh1I9xGXz1ghhIBa1T0OTQ2ONEvMGcHszKsq5DrzUkv
5syXKCiMtH0tN0gxRAbHOGKc0GNZVLHah9ykw8ylo2zC2g+yL92IHbbcOqX9ZsVZ
6eDZHdM8bG2Iu62e6u8PYNF5MzbeevuPX6woL3Hk6IFXaG60HBrUOTLHKpTHeCi0
tW5grdV/3/UB1aZQsXicY2BmAIP/zQxGDFgAAChEAbgA") format("woff");}
Otf2dl
1
.bf255255255-default{fill: rgb(255,255,255);} .f000000000-
default{fill: rgb(0,0,0);unicode-bidi: bidi-override;}
```

The Gettysburg Address

Four score and seven years ago our fathers brought forth on this continent, a new nation,
conceived in Liberty, and dedicated to the proposition that all men are created equal.
Now we are engaged in a great civil war, testing whether that nation, or any nation so conceived
and so dedicated, can long endure. We are met on a great battle-field of that war. We have come
to dedicate a portion of that field, as a final resting place for those who here gave their lives that
that nation might live. It is altogether fitting and proper that we should do this.
But, in a larger sense, we cannot dedicate—we cannot consecrate—we cannot hallow—this
ground. The brave men, living and dead, who struggled here, have consecrated it, far above our
poor power to add or detract. The world will little note, nor long remember what we say here, but
it can never forget what they did here. It is for us the living, rather, to be dedicated here to the
unfinished work which they who fought here have thus far so nobly advanced. It is rather for us
to be here dedicated to the great task remaining before us—that from these honored dead we
take increased devotion to that cause for which they gave the last full measure of devotion—that
we here highly resolve that these dead shall not have died in vain—that this nation, under God,
shall have a new birth of freedom—and that government of the people, by the people, for the
people, shall not perish from the Earth.

APPENDIX B

```
@font-face { font-family: "f_4351866d8dec2100079f";
src:url("data:application/font-
woff;base64,d09GRk9UVE8AABQMAAoAAAAAGzQAAQAAAAAAAAAAAAAAAAAAA
AAAAAABDRkYgAAAA9AAAD7EAABS1V4WosUZGVE0AABCoAAAAGgAAABwyNsrbT1Mv
MgAAEMQAAABPAAAAYHgrfphjbWFwAAARFAAAAN4AAAHaRCnia2hlYWQAABHOAAAA
MgAAADYZgl3laGhlYQAAEigAAAAgAAAAJAhcA4pobXR4AAASSAAAAJoAAACsbjgG
XG1heAAABLkAAAABgAAAAYAK1AAbmFtZQAAEuwAAAEMAAACRvKhCVJwb3N0N0AAT
+AAAABMAAAAg/4YAMnicjVh5eFRVln8J1KtnkAKXonumA1EbW23EFkFZ3YCAsrYQ
SAgQQhYSQkglVa/WV3ulKsAJSWrfU2tSWSEJa0IWDEor0iDj8unXX2u3to7z2a2O
0/St+Cozc6sSHKKObfKl8kfu757td87v3KQR06cTaW1p9+yoog/SlaUlC5cuXr5o
6ZLly5YQaelEGrEgPouI/yItnpkenzst/rPpSrb/m5vfrOZkEjArkyBmZxJ/uiuT
yMy86/rdxLQkYBZxP7F4jbB0P11acl+R/L4X16/5/t0/YA1/pREzMfwXxAPEg8Sv
ileJR4iFxG+IRcSTxGpiDbGWyCbWEeuJF4gXiQ3ERmIzsYXYSvyWeInYRmwncogd
xE4il8gndhM6YpS4Rvwb8TbxB2JB0qf5xEOEkPAT36Rp0/6Svjr9D9Pk096enj19
lJPFWcDxkPeSDDnGraau37HrDkfGrIzNMx6csWDGshnn7lx15yszj8/828ybvCIe
mvXMrOdnyWd1z3549v7ZdvYlGIpnD6UNDaGLQ9OG5sTb4/MT7Vz26yE+uhjPZi+S
PLaDl1jcw/6WP8x9L9rXAxfAabLpLXqLzqxp0pq1Vr1Nbzd5wA9hq9/jpDyugCUE
LRDUNcv9cnsNlAM784VV7L+UUMDlJe5BC/X8XGHs0mg0NpIVAL/Ro/FqrGKohEqD
mNEo1XKjFJJH2U/Q2riBLwG5mXGqnIYQdECnNeR2eJ1+cxBGICqAHKisFSs1FKOR
GyVJVKJ+egrgmgR0YIBzAkCNRAU524WC3Cx8OXoepg+HuRHwm50uh9PV4umjUGSs
4nNAbeNHOTahQ+HUufT+ughQ3jz2k+E2cjAS6MsCM1iOWo5aj1iP2Kh8NJd9B/ay
93IM0joFMFRxq/TlebE8dphEYXSTj9rgOVRR9p8cbYeho7bNVFUr0FXrq7UVqlJq
GSvm8FD2wJxhDzcGkaZme8Bhj0AvFf+cCyd1YalNahc1VQOlHIlnkOgu+FvpjWdv
```

APPENDIX B-continued

```
PHviPmCz4Anl04c3bGbnshnr2eeBSuADhtf5N0m086/oLtSAGn6NZrM7su4b15G8
6ykTrdhEwBaw20Nwkor/lQt9uojULsMmBCkTCdLMVmwE4wjHcO1A1yag2P3se+jC
VvZCIh1pyV6I2X0Bf8ARaWyhbBevgJ6tGH8AcASKuFrDXwir/Jt62VnvbEE/B7QV
Pva+33ntTfRLdPdbaBN8CtfV52rO14QqAHOgRisRK8VMTe0hgKgpqo3Qo/mx1cDm
wAL2HmBtwPLCC/s3UKOrvjgEHvaGGgINviYK7fo2K3QyK6ZhdCOvjhSB1MRoGZ1e
BKUUW81dUbpI/nCKPaj7p6QWoVyGrAaRSaqT6XQi7B97LH4/OpbKj8yeNIbzw4yg
OD4nwOdkt841cA7L7OKALqAPm1pTJIkPe8kYhJsC9uYJe6gvcT/bx4VSu6hZG9BF
Js+hW0WZ6tyn3y3KpHM0dk6q19FQRoOvR0bM2UCTx+FxOlxWn8XX5Dvup1z/nqyI
d6Iitp8UuIiMbxhfBvFezpS/4FB/l6tMhfptSsZr1nATBWM5kHidA6U2UQDHEjbF
UrFcJnmDP8ne5+TX8C49uHewILoJVsFubYGkcO/CR/awjwL1DFtMTknm6bzEbEzp
+P38q+Q7cNHb2dXV7R2F9+BN5bCgS9CV780GalniSZL3Gto4Zzg21d5jK9gMbjkI
dSqpSmqg66opY+4mMKOKsbWQYrlphFPXqg+rAupAjb0Mc33G+BJySmSxpAM81Kjh
35cRe5d/fwbPG1+n4T8Fm08Uv0UZQPwomwswbAdO6+1xj83nwonbWKobQWJWTMKB
Y6VHi49JQXlMTzWR/p5we3uoLdTnuAAUWvEBy2HFrGwZ/rUCjybp+/wHMnjr0Rca
PrvlMTQd0Uj+KSLRhqxu6Krr0nfpW1VBWVDuoEEAAp1UppFrqk3lAJ+VD6wDqhIE
BpqhFXKBer+m2LgNVsMS98a2wrbCAclV6IMua8xLxbzBoDvq1lgYkILcIGPk5UVb
JItTjfMPdANbXrkMcZAYyT7Av1ZmfQhXyvrWUlbS1HPkPIxQX30vTMn4iWQJaVxC
XaqE9jxcVDVKNwJHUSqqqqKrJCXa3UkLgff5v8zgVaH/0vCfgOy2XZd3vSr8AG5C
MkwuehHeh9dF5/P7880r4dfU9sQCbv0Tvg3txR3F56SX4QyctLX72n2hgCfUdLTJ
1FTbZGgwgJYCxiBnZEq5SHFIfUhVbEyZYpdiCqFuEs3f99YT8xZB/ho9Oz+lLTO6
5gx7uVO6Nb6PnfYqmvY7LrzdfKmvr693JHAN3oDz+igTZVxSqAGJTiHXyDQi02F8
ecQU0gS0QYm9EspApFZXq6uNJZBLrUXPvcQ+l9g3te0H8hI8kidHJ9h+zKJN3v0d
hZ2Ss3AJBjw9HdH2yEnvaQtjxTrnVflqsXzi+81Bp9/lD/hj3nJPdUTWJe3W98Bp
uNE82nuq7/QrgfeAaofWuhZDi6FZ79A6XF530BvwRiyYklhWnWqnxqwEOQUKk1Kr
1mkYIw3QqnZX45or6hidW+GQ2Gg73VgF5RRsle8qKy7c84JskVVTr603HC+Vymqw
KCubtDa9zRCs68RcnUeif722hZ2Bdk1OTuLcvcvl7LTkolujX/APwUxpzfqi1p7
4SKM6k8pWpkWgasYSkCgVlQrqvXFkENBrq3UJ/QLY5q+jE6UCPNfhXPmLlenM+R3
hVwhcwu0QY82KnFJXJXmItycd5I0SI5IjFIjo1ExaoVRBIdA2Ci2yW0yrzKsC2s6
TWdS1H03NGfYzv3nHRkiQYl7UXFMeUx1TEsdU5iB0/PO5Z4PcYjz31rJLs5iz3CT
88Cv9U2wuTGPPRhfQaLpBZeemLcLSmWiMlGZZjdspVjHVB3AJ/+Il6Y+tGvMz8eJ
NqsdKocxgIMaCkcHoBm8JrcWd54Md29VrVSlpVRaxihLsfXpcT9/fgYvsR5t/has
dtQmwTFLswsvKr6mQOoK1+QV1MQd6m+v2PPfo/xXbNw2iFqCrjOtweuA0ql4W3Ic
h6T2ySTUjSDB+GMksJklTz5dVqbYb9gD1BR7fcWb7IofTSAWCGa8g7xF71s68CXJ
ix/onuipUJPf7ndYUz11N7asD8ntcrs4iT4ygraT3odwvqP9sfZ2d4e729KDp9IJ
Q6eiUxEReIooOxnpb2vvcne5T1h64XUY1J0oPVng2wpLqcmq+LR+XcjUBlTDRFVg
RHda1i5rr/DsgU1QVCndbKiuOwwVFBv8wSrefr4MqvAILT0o2warbq9lxNRyq5Zf
dM95EM//5Lz6VcbxK/yHMnj2EG7jW1RzYNlJZWrp1CzjTFWQTnZaE3B+bOJPaoqJ
PE7XC+ur6/GYwZskewc3NU71t9MqnonYpDj8A/1P0v6pCdHF9m1J+3/ngqveB4H6
AASSn/Xe4y7KSE6Zvv/PXIfQ5ygPIFcHHAHQRrxvTGxU40tveXFrqCfSyRrsBB7g
vzk1Z7gxNUH/T/bv/h7PXiLDLA+X2x51hpwBZ8DnxR/OmPkknIcuQ1AZUjrEUAVC
vUTBUApFlaEioMsU1Xl0HsYqgv1QeUi8UbHTsB22UWzO1PJ057E3MWnniruGvwXy
HQeCZWFZJ5YITECr0+a025yNziZHgx2g0Hag+TAVONytHIKz0G0PBSIBZyt0Q8Dk
07sMLqVT4hI7K73FPqriX+4T+Kv90qA6rArXtsFJGA2ePdN2pv2S5024DOe07WKq
nfbWwGEQY81RK1Xi2mqAj8rPZmN/D+vlcoVMT0MVBZUOUVgRYfpkL4vPybtlrfJW
RUDipF0icxUchI3i3QWHqH2HtjFrJt47PtSv4W+Gfe6qmCCmGoQbVPzRxwa5HvA2
+Mx+i9fudrk8Dr8taA9ZWszt1CX2EbRkLbsk8Ti5sqP49XkeciHzuKse/zRQO7g6
E1MnSX4fnXhPfYQ+0vAfzuAF0Pk57K74SY6+RetTWzU2WVMNfhyhy7kMN18oLcmC
2vra4/inwdCgpz5gGY7jsL3CUUZFn+I0+mxRZxfV89nHSM9peZfuXQ2UYQS58cpI
g9yoUWs1qhr8umF3JsxYGTi8AUzUV7ijcN5xinilp//N9q8pVhLv4GhbND6tVWuT
N9EpnvInHiEnjKsalBaG+gtbxXFXevZ7d1okjYoGtTlsidha7C3WqC1C/REbj2Hj
z6Wg1tzkOyBpXKNRp4xvSTg4kq3S3dID0lJJlUgikhxWlRnKDAV1O7ACkLzlw3Ng
EKF4F7sdOBUgMWgVOoVOpD9EHTPmgROtieN1Cu/ziU4kBE4Mmu2OgDNoDZtbKHNs
GIxsfqIOx4ZfxrdtiA1jK/heri/c3BboDpzwdrhaKfQzDa1lTMjIxLaZFdI2ohhbJ
JUqqAJO2OzZnfgbijskxxv8TMHsn51A8H0MkIG2UW+RWxsbYlXaVTWVVW1WNGhAC
U2tU1arrlEcZKoesj5jDtpAt5Pb73c2eiKUdgkm+G/y1Xr1HiztM76qlXAZ3nQsv
DB6L2WVxN3kavNQoWbddVlReLVeLaqtS1L19+O0ZW/fjPleLhN/6PMk57Zgxhfgn
ML7bMTQtSWFqaHoSM7bp3rFsysY5Nt+BivCGRLL9wIU7MzKJzHuIO5L/CrESA8Rn
aXPTctPeSZ+evjz9dA4UeA90lHfKB+EaXA1fON8x0HHD/x8N1FeN8DYH2o62mEKm
sM6ncDFuofkgbIODEs0+k/SIGGoOgtAsd1Jyp6EZYviZGwr4e7queD+Bd+ES01PZ
c8ifA89Q7A0uHDTTDo1T3WyMpaRnGSn9Ox6YClohZRSMXKYS68Q6gakimbzEZg3DK
29be1uE5jddl+PLpOs66I7uV1ciaoboMdlPPdpX+fh4+9tXQx2htFvxZc5U+S58r
CeXARigUiwrp/ZoXYTE85dwQLogUnKPfSF36BpwLhs9GzjquwsfwJ+1V0Xm6f194
A+yAEpreSxdoX4SnKFji2BjeFy7sk4ymQClBD9/2+P/595eBhJv87sPuS3IGFrjv
j3c9RsonkLUjKH9CzFuwmHe4O7Fi460Ozb1+2wrlxeibSt5pvrVC7bu0aN4BLLti
WXGFdBusnJBdG57rzRNaZ05q3YzFsC6WdynvkvDPgLiAxJ9jxcrBcb8pGNo+nBN9
CliSYmULsIZuT2byNTgXifRHB5w34FP4VHO9pl/YXxjeAlugkBbuFe7VrlfHKXjc
md2yJ7r3rOi1VG42wC5/eW95r+I1+JBCAz+QmJUk7LQV+av8Vd3KQXgZ+vyRnuhJ
5wW4TKEmLvRO/pfALJg8HyC/uw3uJJkv8COopqCqskJ1UHWgtiR1+n8BYJgpJgAA
AHicY2BgYGQAghrVDQ0g+jZHry6MBgA4AgUNAAB4nGNgYzrM+IWBIYGBqYtpDwMD
Qw+EZnzAYMjIBBRIGNmgAEECwgy05MZGA4wKDD8Ylb4b8EQxbyOURUoazAiSY5rA
nAmUUWBgBACEugyvAHicY2BgYaYBkgRgYQuALKMYL5PLAw7WLGwgbWKQxUkdRj0
GKwYHBlcTWYfBj8GAIYQhiyGoYqhhgWMDxkeMvkwEzew6MqhgeghgGNZxkeMwz6///4F6EGpdGNzahMZ
chgqUdX+f/j/2v+r/0/9P/L/0P+D//f93t/z/+d9+f+X/N/1f/W/67/rf6b/zf7
bwB1G5GAkY2BoAZkeSZwAMAAAC4RiZWBgY2fg4AyuRi4GXIANC+yAXz8AoJCwiKi
YulMEpJS0jKycvJKikoMDMgyAAHKSlVEEx1NbQZAAHKSlAlSTVMAAAsEI8iwAAeJxj
YGRgYABi/vk82dJ8N18ZuJlYEUYbnP06sLo//3/3WZZJZF5H5HIwMFIEASc/C6AA
AHicY2BkYGBe9+82QxRL8/+PDAwsiQxAERSwAwsiQxAERSwAwsiQxAERSwAwsiQxAERSwAwsiQxAERSw
GHwYExiSMmYYGJiiTGPS0jbbpoMM09ncGM+BW0VvBNKgPdgdyYbpoMMy5Dn9M7M7M7M
MgzOTFOApBWk+gwzTHWYxxxskMM09n9krGYYGYGlmUGIWYYACwAACqndm2s0gAFYf
yqDBpMFgzriSQZA6jnKAMr0ExWpngGY5B7QOYzzmCQgekDqQEAR2Af6gAAAABQ
```

APPENDIX B-continued

```
AAArAAB4nKWPsU4CQRCG/4WDhIYYOhNjtqB0ye5COI6WAmlsDLQGuJVsQo7kuAZr
fR0fxZfxBfw9pjDRwugmM/PNzD87uwC6eIXC+XRxLazQw71wAx08CTfRx5twgp66
FG7hQt0Jt1l/oVllHWZX9dQnK84a4QbvfxRu4hbPwgk178ItaHUj3EZfPWCGEgFr
VPQ5NDY40S8wZwezMqyrkOvNSS/mzJcoKIy0fS03SDFEBsc4YpzQY1lUsdqH3KTD
zKWjbMLaD7Iv3Ygdttw6pf1mxVnp4Nkd0zxsbYi7rZ7q7w9g0XkzNt56+49frCgv
ceTogVdobrQcGtTRMscqlMd4KLS1bmCt1X/f9QHVplCxeJxjYGYAg//NDEYMWAAA
KEQBuAA=") format("woff");}
Otf2dl
1
.bf255255255-default{fill: rgb(255,255,255);} .f000000000-
default{fill: rgb(0,0,0);unicode-bidi: bidi-override;}
```

La dirección de Gettysburg
Hace cuatro años y siete años, nuestros padres dieron a luz
en este continente, una nueva nación,
concebida en Libertad, y dedicada a la proposición de que
todos los hombres son creados
iguales.
Ahora estamos involucrados en una gran guerra civil,
probando si esa nación, o cualquier nacion
tan concebida y dedicada, puede perdurar por mucho
tiempo. Nos encontramos en un gran
campo de batalla de esa guerra. Hemos llegado a dedicar una
parte de ese campo, como un lugar
de descanso final para aquellos que aqui dieron sus vidas
para que esa nación pudiera vivir. Es
totalmente apropiado y apropiado que hagamos esto.
Pero, en un sentido más amplio, no podemos dedicar, no
podemos consagrar, no podemos
santificar, este terreno. Los hombres valientes, vivos y
muertos, que lucharon aquí, lo han
consagrado, muy por encima de nuestro pobre poder para
sumar o restar valor. El mundo se dará
cuenta, ni recordará mucho lo que decimos aqui, pero nunca
puede olvidar lo que hicieron aquí.
Es para nosotros los vivos, más bien, dedicarnos aquí al
trabajo inacabado que los que lucharon
aqui han avanzado pasta ahora noblemente. Es más bien para
nosotros estar aqui dedicados a la
gran tarea que nos queda por delante: que de estos honrados
muertos tomemos una mayor
devocion a esa causa por la cual dieron la última medida de
devocion completa, que aqui
resolvamos altamente que estos muertos no habrd muerto en
nano, que esta nación, bajo Dios,
tenga un nuevo nacimiento de libertad, y que el gobierno del
pueblo, por el pueblo, por el
pueblo, no perecerá de la Tierra.

What is claimed is:

1. A system, comprising:
a processor;
a non-transitory computer readable medium, comprising instructions for:
receiving an electronic document in a source format at a format agnostic document viewer;
converting, at the format agnostic document viewer, the document from the source format to a format agnostic format utilized by the format agnostic document viewer to generate a format agnostic version of the document;
receiving, at the format agnostic document viewer, a selection of original text in the document and an associated language, wherein the original text is in a first language and the associated language is a second language;
submitting, by the format agnostic document viewer, a request for a translation of the selection of original text to a translation service over a computer network, wherein the request includes the selection of original text and specifies the associated second language;
receiving, at the format agnostic document viewer, translated text in response to the request for the translation over the computer network, the translated text comprising the selection of original text in the second language; and
displaying, by the format agnostic document viewer, the translated text in association with a display of the document in the format agnostic viewer, wherein the display is generated by rendering the format agnostic version of the document in the format agnostic document viewer according to a display format associated with translated text.

2. The system of claim 1, wherein the selection of the original text is based on a user interaction with the display of the document in the format agnostic document viewer.

3. The system of claim 1, wherein the display format specifies displaying the translated text side-by-side with the display of the document in the format agnostic document viewer.

4. The system of claim 1, wherein the display format specifies the translated text replaces the selected original text in the display of the document.

5. The system of claim 4, wherein replacing the selected original text in the display of the document comprises, in response to receiving the translated text:
locating the selected original text in the format agnostic version of the document;
replacing the selected original text in the format agnostic version of the document with the translated text; and
rendering the format agnostic version of the document with the translated text in the format agnostic document viewer.

6. The system of claim 5, wherein the original text is associated with a displayed non-textual element in the source version of the document and the translated text is rendered at a same location as the original text relative to the displayed non-textual element in the display of the document.

7. The system of claim 6, wherein the display format specifies applying a conversion rule to the translated text such that one or more of an orientation, length or character size is substantially similar between a display of the original text and the displayed translated text.

8. A method, comprising:
receiving an electronic document in a source format at a format agnostic document viewer;
converting, at the format agnostic document viewer, the document from the source format to a format agnostic format utilized by the format agnostic document viewer to generate a format agnostic version of the document;

receiving, at the format agnostic document viewer, a selection of original text in the document and an associated language, wherein the original text is in a first language and the associated language is a second language;

submitting, by the format agnostic document viewer, a request for a translation of the selection of original text to a translation service over a computer network, wherein the request includes the selection of original text and specifies the associated second language;

receiving, at the format agnostic document viewer, translated text in response to the request for the translation over the computer network, the translated text comprising the portion selection of original text in the second language; and displaying, by the format agnostic document viewer, the translated text in association with a display of the document in the format agnostic viewer, wherein the display is generated by rendering the format agnostic version of the document in the format agnostic document viewer according to a display format associated with translated text.

9. The method of claim 8, wherein the selection of the original text is based on a user interaction with the display of the document in the format agnostic document viewer.

10. The method of claim 8, wherein the display format specifies displaying the translated text side-by-side with the display of the document in the format agnostic document viewer.

11. The method of claim 8, wherein the display format specifies the translated text replaces the selected original text in the display of the document.

12. The method of claim 11, wherein replacing the selected original text in the display of the document comprises, in response to receiving the translated text:
    locating the selected original text in the format agnostic version of the document;
    replacing the selected original text in the format agnostic version of the document with the translated text; and
    rendering the format agnostic version of the document with the translated text in the format agnostic document viewer.

13. The method of claim 12, wherein the original text is associated with a displayed non-textual element in the source version of the document and the translated text is rendered at a same location as the original text relative to the displayed non-textual element in the display of the document.

14. The method of claim 13, wherein the display format specifies applying a conversion rule to the translated text such that one or more of an orientation, length or character size is substantially similar between a display of the original text and the displayed translated text.

15. The computer readable medium of claim 8, wherein the selection of the original text is based on a user interaction with the display of the document in the format agnostic document viewer.

16. A non-transitory computer readable medium, comprising instructions for:
    receiving an electronic document in a source format at a format agnostic document viewer;
    converting, at the format agnostic document viewer, the document from the source format to a format agnostic format utilized by the format agnostic document viewer to generate a format agnostic version of the document;
    receiving, at the format agnostic document viewer, a selection of original text in the document and an associated language, wherein the original text is in a first language and the associated language is a second language;
    submitting, by the format agnostic document viewer, a request for a translation of the selection of original text to a translation service over a computer network, wherein the request includes the selection of original text and specifies the associated second language;
    receiving, at the format agnostic document viewer, translated text in response to the request for the translation over the computer network, the translated text comprising the portion selection of original text in the second language; and
    displaying, by the format agnostic document viewer, the translated text in association with a display of the document in the format agnostic viewer, wherein the display is generated by rendering the format agnostic version of the document in the format agnostic document viewer according to a display format associated with translated text.

17. The computer readable medium of claim 16, wherein the display format specifies displaying the translated text side-by-side with the display of the document in the format agnostic document viewer.

18. The computer readable medium of claim 16, wherein the display format specifies the translated text replaces the selected original text in the display of the document.

19. The computer readable medium of claim 18, wherein replacing the selected original text in the display of the document comprises, in response to receiving the translated text:
    locating the selected original text in the format agnostic version of the document;
    replacing the selected original text in the format agnostic version of the document with the translated text; and
    rendering the format agnostic version of the document with the translated text in the format agnostic document viewer.

20. The computer readable medium of claim 19, wherein the original text is associated with a displayed non-textual element in the source version of the document and the translated text is rendered at a same location as the original text relative to the displayed non-textual element in the display of the document.

21. The computer readable medium of claim 20, wherein the display format specifies applying a conversion rule to the translated text such that one or more of an orientation, length or character size is substantially similar between a display of the original text and the displayed translated text.

\* \* \* \* \*